US009998775B2

(12) United States Patent
Tarbox et al.

(10) Patent No.: US 9,998,775 B2
(45) Date of Patent: *Jun. 12, 2018

(54) ENFORCEMENT OF TRICK-PLAY DISABLEMENT IN ADAPTIVE BIT RATE VIDEO CONTENT DELIVERY

(71) Applicant: Google Technology Holdings LLC, Mountain View, CA (US)

(72) Inventors: Brian J. Tarbox, Littleton, MA (US); Erik J. Elstermann, Carlsbad, CA (US); Barry P. Falvo, Eagleville, PA (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/395,797

(22) Filed: Dec. 30, 2016

(65) Prior Publication Data

US 2017/0150190 A1 May 25, 2017

Related U.S. Application Data

(63) Continuation of application No. 13/894,926, filed on May 15, 2013, now Pat. No. 9,537,920.

(Continued)

(51) Int. Cl.
*G06F 15/16* (2006.01)
*H04N 21/2387* (2011.01)
(Continued)

(52) U.S. Cl.
CPC ... *H04N 21/2387* (2013.01); *H04N 21/23805* (2013.01); *H04N 21/44222* (2013.01);
(Continued)

(58) Field of Classification Search
None
See application file for complete search history.

(56) References Cited

U.S. PATENT DOCUMENTS

2006/0222321 A1    10/2006  Russ
2007/0234213 A1*   10/2007  Krikorian ........ H04N 21/23406
                                                        715/716
(Continued)

FOREIGN PATENT DOCUMENTS

CN    102143133 A    8/2011
CN    104871551 A    8/2015
(Continued)

OTHER PUBLICATIONS

Patent Cooperation Treaty, International Search Report and Written Opinion of the International Searching Authority for International Application No. PCT/US2013/041296, dated Feb. 2, 2013, 8 pages.
(Continued)

*Primary Examiner* — Mohamed Ibrahim
(74) *Attorney, Agent, or Firm* — Lowenstein Sandler LLP

(57) ABSTRACT

Disclosed is a method including receiving program event information indicating whether a media asset is to be presented with supplemental content, receiving, from a client, a request for a media-segment file corresponding to the media asset for consumption at the client, determining whether the program event information indicates that the media asset is to be presented with the supplemental content, and restricting trick-play operations in response to the program event information indicating that the media asset is to be presented with the supplemental content and restriction criteria are met.

20 Claims, 12 Drawing Sheets

Related U.S. Application Data

(60) Provisional application No. 61/798,418, filed on Mar. 15, 2013, provisional application No. 61/649,227, filed on May 18, 2012.

(51) Int. Cl.
  *H04N 21/61* (2011.01)
  *H04N 21/6587* (2011.01)
  *H04N 21/238* (2011.01)
  *H04N 21/442* (2011.01)
  *H04N 21/845* (2011.01)

(52) U.S. Cl.
  CPC ..... *H04N 21/6125* (2013.01); *H04N 21/6587* (2013.01); *H04N 21/8456* (2013.01)

(56) References Cited

U.S. PATENT DOCUMENTS

| | | |
|---|---|---|
| 2008/0187283 A1 | 8/2008 | Takahashi |
| 2009/0254657 A1 | 10/2009 | Melnyk et al. |
| 2012/0042335 A1 | 2/2012 | Hwang et al. |
| 2013/0311670 A1 | 5/2013 | Tarbox et al. |
| 2013/0144714 A1 | 6/2013 | Yuan et al. |

FOREIGN PATENT DOCUMENTS

| | | |
|---|---|---|
| EP | 2587757 A1 | 5/2013 |
| WO | 2011150817 A1 | 12/2011 |
| WO | 2013173554 A1 | 11/2013 |

OTHER PUBLICATIONS

Office Action and Search Report dated Jun. 28, 2017 issued by the State intellectual Property Office of the People's Republic of China in Chinese Application No. 201380036454.8, with Translation.

\* cited by examiner

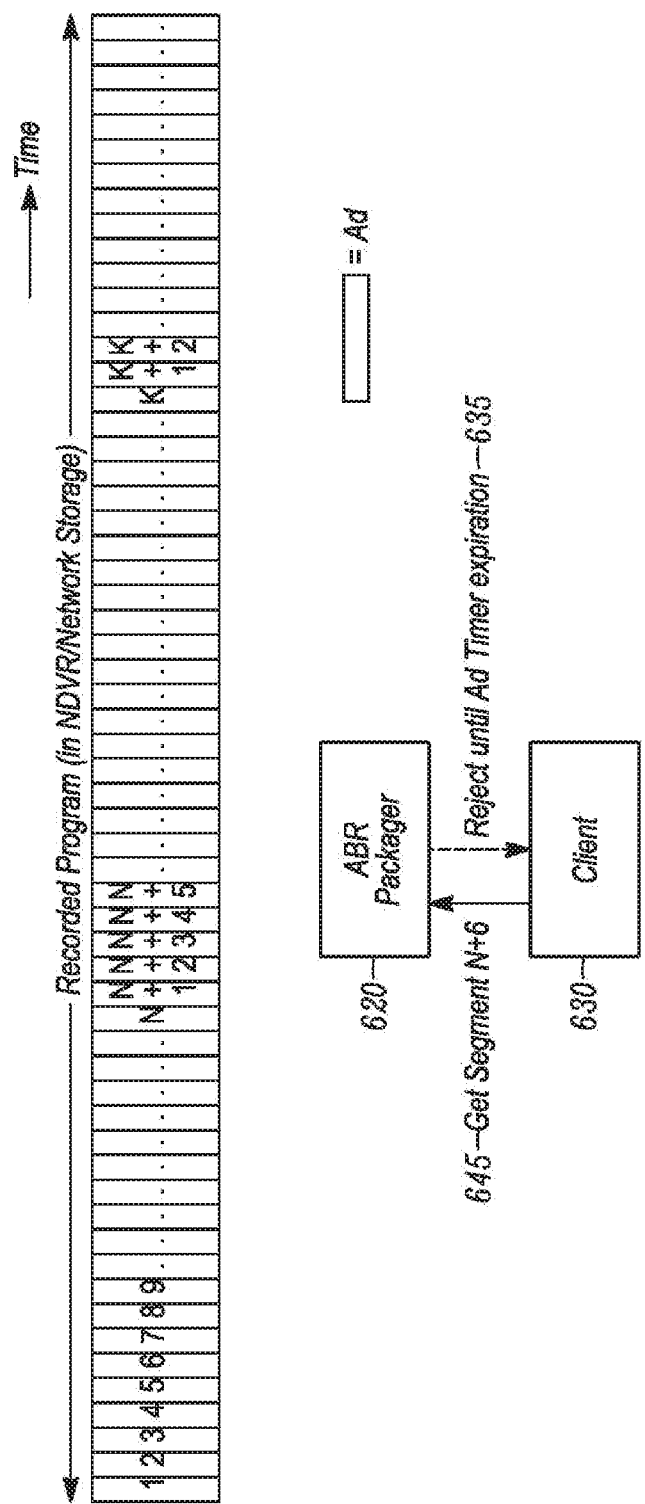
FIG. 6C1

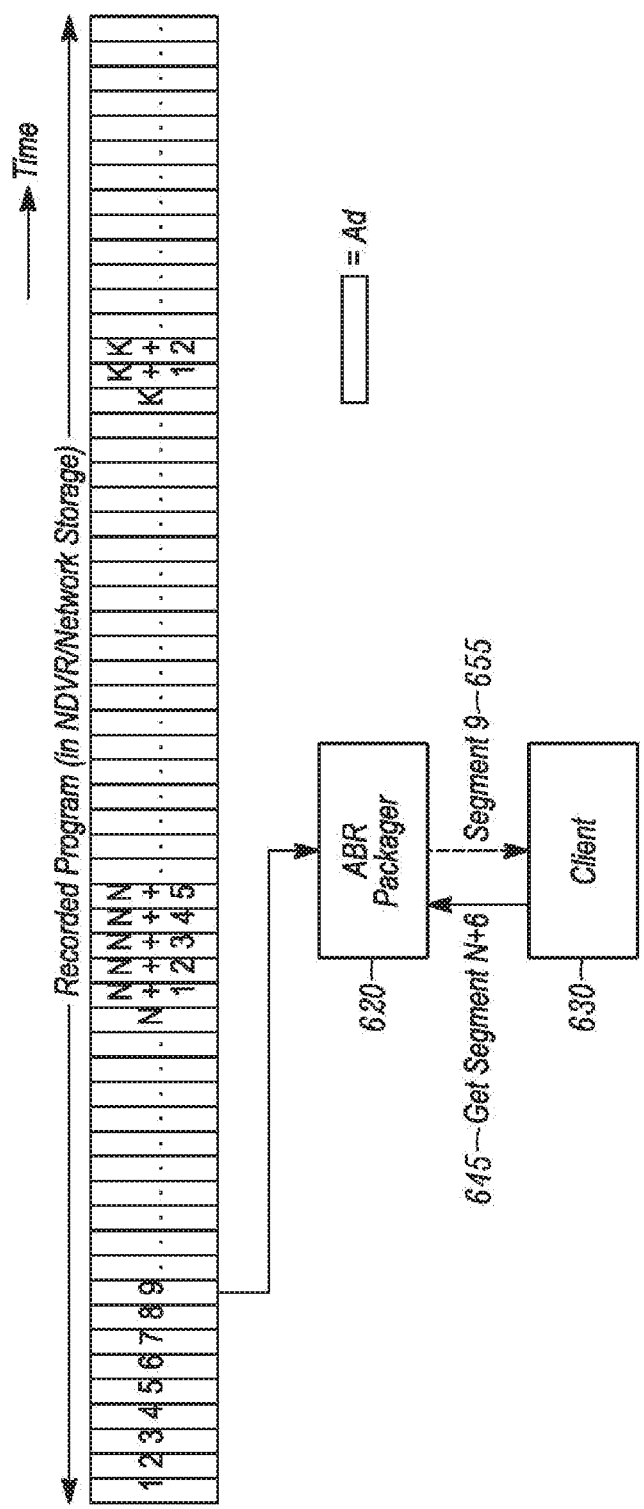
FIG. 6C2

ENFORCEMENT OF TRICK-PLAY DISABLEMENT IN ADAPTIVE BIT RATE VIDEO CONTENT DELIVERY

RELATED APPLICATION

This application is a continuation of co-pending U.S. application Ser. No. 13/894,926, filed on May 15, 2013, which claims the benefit under 35 U.S.C. § 119(e) of U.S. Provisional Application 61/798,418 filed on Mar. 15, 2013, and claims the benefit of U.S. Provisional Application 61/649,227 filed on May 18, 2012, which are herein incorporated by reference.

TECHNICAL FIELD

The present disclosure is related generally to video display and, more particularly, to enforcing disablement of trick plays in adaptive streaming.

BACKGROUND

The dissemination and playback of media programs has undergone substantial changes in the past decade. Previously, media programs (which may include audio, video, or both) were disseminated either by analog broadcast (conventional, satellite, or cable) or by dissemination of films to movie theaters.

These traditional dissemination and playback means remain in use after the advent of digital technology. However, digital technologies have had a profound effect on the dissemination and playback of media programs. For example, digital technology permitted the use of digital video recorders ("DVRs"). DVRs, while similar in function to standard analog video cassette recorders, provide a number of additional useful functions including live pause, the ability to record one program while playing back another, and the integration of the electronic program guides with DVR functionality (so that the recording of media programs could be scheduled far in advance).

SUMMARY

Digital technology also permitted the dissemination and playback of media programs via the Internet, with improved signal processing. These methods of dissemination and playback have become competitive with traditional means. Dissemination of media programs via the Internet may occur either by simple downloading, progressive downloading, or streaming.

For progressive download, a media file having the media program is downloaded via the Internet using dial-up, DSL, ADSL, cable, T1, or other high speed connection. Such downloading is typically performed by a web server via the Internet.

Simple downloading downloads the bytes of the media file in any convenient order, while progressive download downloads bytes at the beginning of a file and continues downloading the file sequentially and consecutively until the last byte. At any particular time during progressive downloading, portions of the file may not be immediately available for playback. In some situations, the entire file must be downloaded first before a media player can start playback. In other progressive download situations, media players are able to start playback once enough of the beginning of the file has downloaded, however, the media player must download enough information to support some form of playback before playback can occur. Playback of progressively downloaded media files is often delayed by slow Internet connections and is also often choppy or presents a high likelihood of stopping after only a few seconds. Once a progressively downloaded media program has been completely downloaded, it may be stored on the end-user computer for later use.

Streaming delivers media content continuously to a media player and media playback occurs simultaneously. The end-user is capable of playing the media immediately upon delivery by the content provider. Traditional streaming techniques originate from a single provider delivering a stream of data to a set of end-users. High bandwidth and central processing unit ("CPU") power are required to deliver a single stream to a large audience, and the required bandwidth of the provider increases as the number of end-users increases.

Unlike progressive downloading, streaming media can be delivered on-demand or live. Wherein progressive download requires downloading the entire file or downloading enough of the entire file to start playback at the beginning, streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities.

Typically, progressively downloaded media are transmitted to the user computer at a rate that is faster than playback. The media program player buffers these data and may indicate how much of the media program has been buffered by providing an indicator, usually as a part of a "progress bar." A control is often provided that allows the user to go to any point in the program that has already been buffered by selecting the control and moving it to a different location along the progress bar. This allows the user to randomly access any buffered portion of the media program.

Adaptive Bit Rate ("ABR") streaming is a technology that combines aspects of streaming and progressive download to provide streaming of media content by breaking the content into a sequence of small HTTP-based file segments, each segment containing a short interval of playback time of content whose total playback time may be many hours in duration, such as a movie or the live broadcast of a sports event. An ABR player provides streaming playback by requesting an appropriate series of segments as determined by a manifest or playlist file and user requests, such as play, pause, rewind, etc. For example, the user may use HTTP Get or Byterange requests to obtain such media segments.

While the appended claims set forth the features of the present techniques with particularity, these techniques, together with their objects and advantages, may be best understood from the following detailed description taken in conjunction with the accompanying drawings of which:

BRIEF DESCRIPTION OF THE DRAWINGS

While the appended claims set forth the features of the present techniques with particularity, these techniques, together with their objects and advantages, may be best understood from the following detailed description taken in conjunction with the accompanying drawings of which:

FIGS. 6A, 6B, 6C1, and 6C2 illustrate an example of trick-play enforcement at sequential instances of time in accordance with embodiments of the disclosure.

DETAILED DESCRIPTION

Figure 1A:
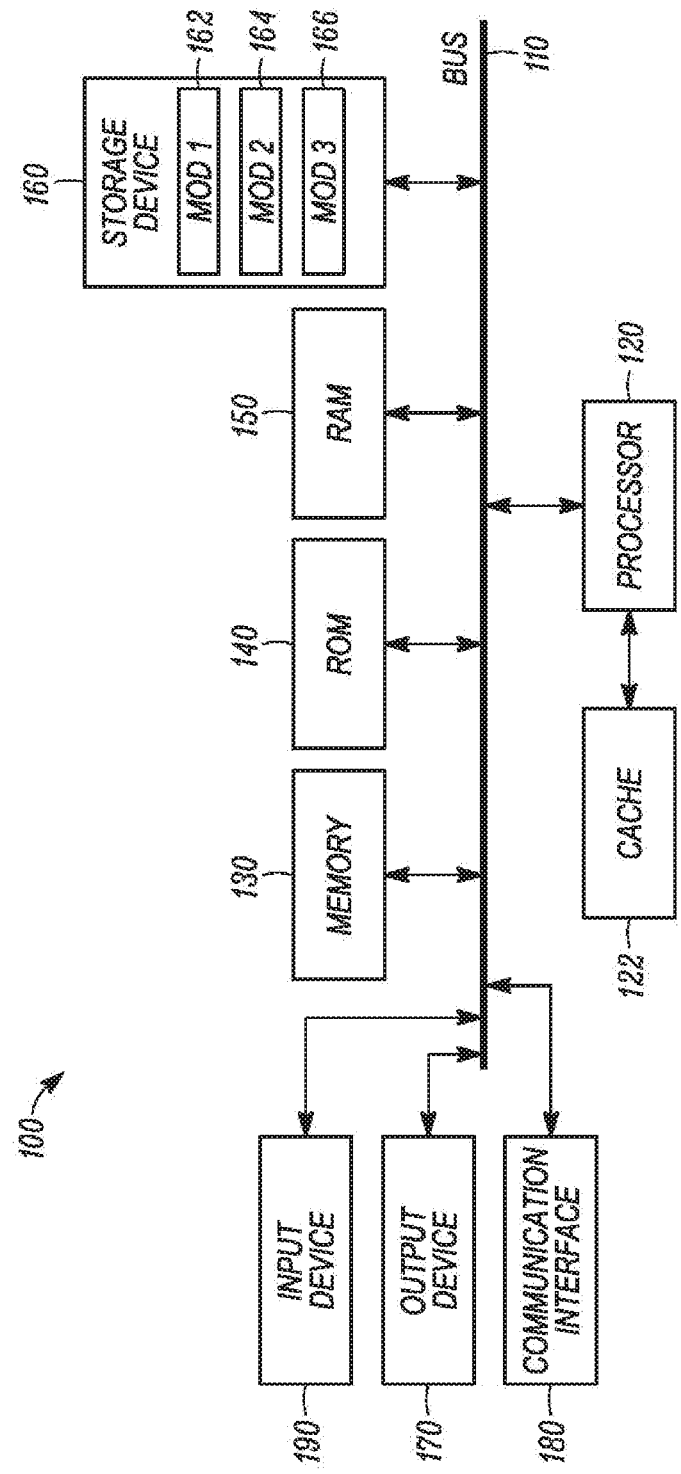
FIG. 1A illustrates an example system implementation in which embodiments of the disclosure may be used.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

In a first aspect of the present disclosure, a method comprises generating a top level manifest file for a media asset or stream that includes program event information, providing the top level manifest file and corresponding element manifest files to a real-time adaptive bitrate packager, and receiving a request for a media-segment file from a client, wherein the ABR packager is configured to interpret the program event information, and wherein the ABR packager is configured to restrict trick-play operations if a program event is detected in a requested media-segment file and restriction criteria are met.

In a second aspect, a system is disclosed comprising a video coder configured to receive a program stream including program event information and configured to output multiple adaptive bitrate streams, memory configured to record the multiple ABR streams, and an ABR packager configured to request at least one of the multiple ABR streams from memory and to deliver the at least one of the multiple ABR streams to a client.

With reference to FIG. 1A, an exemplary playback device 100 includes a general-purpose computing device, including a processing unit (CPU or processor) 120 and a system bus 110 that couples various system components including the system memory 130 such as read-only memory ("ROM") 140 and random-access memory ("RAM") 150 to the processor 120. The system 100 can include a cache 122 of high-speed memory connected directly with, in close proximity to, or integrated as part of the processor 120. The system 100 may be configured to copy data from the memory 130 or a storage device 160 to the cache 122 for quick access by the processor 120. In this way, the cache 122 provides a performance boost that avoids processor delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general-purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output system ("BIOS") stored in ROM 140 or the like, may provide the basic routine that helps to transfer information between elements within the computing device 100, such as during start-up. The computing device 100 further includes storage devices 160, such as a hard disk drive, a magnetic disk drive, an optical disk drive, tape drive, or the like. Other hardware or software modules are contemplated. The storage device 160 is connected to the system bus 110 by a drive interface. The drives and the associated computer-readable storage media provide nonvolatile storage of computer-readable instructions, data structures, program modules, and other data for the computing device 100. In one aspect, a hardware module that performs a particular function includes the software component stored in a non-transitory computer-readable medium in connection with the necessary hardware components, such as the processor 120, bus 110, output device 170, and so forth, to carry out the function. The basic components are known to those of skill in the art and appropriate variations are contemplated depending on the type of device, such as whether the device 100 is a small, handheld computing device, a desktop computer, or a computer server.

Although some implementations employ a hard disk 160, it should be appreciated by those skilled in the art that other types of computer-readable media which can store data that are accessible by a computer, such as magnetic cassettes, flash memory cards, digital versatile disks, cartridges, random-access memories 150, read-only memory 140, a cable or wireless signal containing a bit stream, and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech, and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement, and therefore, the basic features here may easily be substituted for improved hardware or firmware arrangements as they are developed.

For clarity of explanation, the illustrative system embodiment is presented as including individual functional blocks, including functional blocks labeled as a "processor" or processor 120. The functions these blocks represent may be provided through the use of either shared or dedicated hardware, including, but not limited to, hardware capable of executing software and hardware, such as the processor 120, that is purpose-built to operate as equivalent to software executing on a general-purpose processor. For example the functions of one or more processors presented in FIG. 1A may be provided by a single shared processor or multiple processors. Illustrative embodiments may include microprocessor or digital signal processor ("DSP") hardware, read-only memory 140 for storing software performing the operations discussed below, and random access memory 150 for storing results. Very large scale integration ("VLSI") hardware embodiments, as well as custom VLSI circuitry, in combination with a general purpose DSP circuit, may also be provided.

The logical operations of the various embodiments may be implemented as: (1) a sequence of computer-implemented steps, operations, or procedures (generally "instructions") running on a programmable circuit within a general use computer, (2) a sequence of computer-implemented steps, operations, or procedures running on a specific-use programmable circuit, or (3) interconnected machine modules or program engines within the programmable circuits. The system 100 shown in FIG. 1A can practice all or part of the disclosed methods, can be a part of the disclosed systems, and can operate according to instructions in the disclosed computer-readable storage media. Such logical operations can be implemented as modules configured to control the processor 120 to perform particular functions according to the programming of the module. For example, FIG. 1A illustrates three modules Mod 1 162, Mod 2 164, and Mod 3 166 which are modules configured to control the processor 120. These modules may be stored on the storage device 160 and loaded into RAM 150 or memory 130 at runtime or may be stored as would be known in the art in other computer-readable memory locations.

Content delivery describes the delivery of media "content" such as audio or video or computer software and games over a delivery medium such as broadcasting or the Internet. Content delivery generally has two parts: delivery of finished content for digital distribution, with its accompanying metadata, and delivery of the end product to the end-user.

As used herein, "streaming media" are media received by and presented to an end-user while being delivered by a streaming provider using Adaptive Bit Rate streaming methods. The name refers to the delivery method of the medium rather than to the medium itself. The distinction is usually applied to media that are distributed over telecommunications networks, e.g., "on-line," as most other delivery systems are either inherently streaming (e.g., radio, television) or inherently non-streaming (e.g., books, video cassettes, audio CDs). Hereinafter, on-line media and on-line streaming using Adaptive Bit Rate methods are referred to as "media" and "streaming."

Adaptive Bit Rate streaming is a technology that works by breaking the overall media stream into a sequence of small HTTP-based file downloads, each download loading one short segment of an overall potentially unbounded transport stream. As the stream is played, the client (e.g., a media player) may select from a number of different alternate streams containing the same material encoded at a variety of data rates, allowing the streaming session to adapt to the available data rate. At the start of the streaming session, the player receives a manifest containing the metadata for the various sub-streams which are available. Since its requests use only standard HTTP transactions, Adaptive Bit Rate streaming is capable of traversing a firewall or proxy server that lets through standard HTTP traffic, unlike UDP-based protocols such as RTP. This also allows a content delivery network to readily be implemented for any given stream. ABR streaming methods have been implemented in proprietary formats including HTTP Live Streaming ("HLS") by Apple, Inc., and HTTP Smooth Streaming by Microsoft, Inc. ABR streaming has been standardized as ISO/IEC 23009-1, Information Technology—Dynamic Adaptive Streaming over HTTP ("DASH"): Part 1: Media presentation description and segment formats.

An increasing number of video playback devices, such as the Apple iPad™, prefer video content to be delivered via ABR streaming rather than streamed continuously. The iPad™, using Apple's HLS format, receives the manifest as an m3u8 file that contains links and media uniform resource identifiers ("URIs") to each of the segments or "chunks" of video content and processes the manifest file to retrieve and play back each media segment in turn.

Figure 1B:
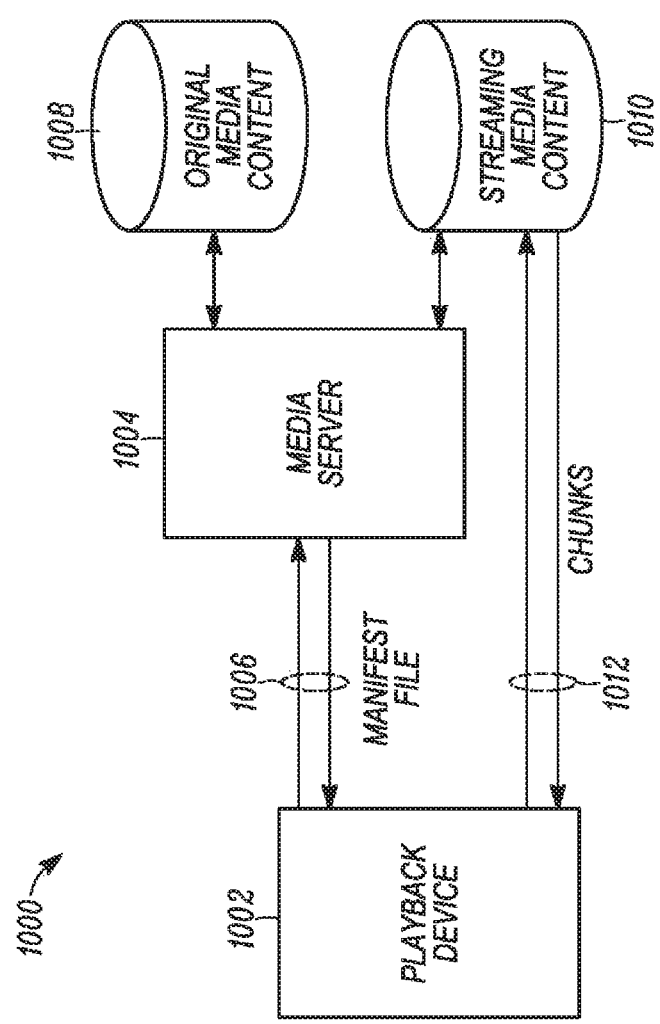
FIG. 1B illustrates an example media-streaming system implementation in which embodiments of the disclosure may be used.

Having disclosed some components of a computing system, the disclosure now turns to FIG. 1B, which illustrates an example media-streaming system embodiment 1000. The communications between the entities depicted in FIG. 1B can occur via one or more wired or wireless networks. Further, the devices can communicate directly, via the World Wide Web, or via an application programming interface. A playback device 1002, such as a tablet device, smartphone, desktop or portable computer, set-top box, Internet-enabled television, media center PC, or any other suitable device, first makes a request to a media server 1004 for playback of media content. Typically, the media server 1004 resides in a network, such as the Internet or a third-party content distribution network such as Akami™ or Limelight™.

In HLS, the media server 1004 receives the request and generates or fetches a manifest file 1006 to send to the playback device 1002 in response to the request. Example formats for the manifest file 1006 include the m3u and m3u8 formats. An m3u8 file is a specific variation of m3u encoded using UTF-8 Unicode characters. The m3u file format was initially used in the WINAMP Media Player for only audio files but has since become a de facto playlist standard on many media devices for local and streaming media, including music and other media types. Many media devices employ variations of the m3u file format, any of which can be used according to the present disclosure. A manifest file can include links to media files as relative or absolute paths to a location on a local file system or as a network address, such as a URI path. The m3u8 format is used herein as a non-limiting example to illustrate the principles of manifest files including non-standard variants.

The manifest file 1006 includes a list of Uniform Resource Locators ("URLs") pointing to different representations of the requested segmented media content. Before or at the time of the request, the media server 1004 generates or identifies the media segments of the requested media content as streaming media content 1010. The media segments of the streaming media content 1010 are generated, either by the media server 1004, the content producer, or some other entity, by splitting the original media content 1008. Upon receiving the manifest file 1006, the playback device 1002 can fetch a first media segment for playback from the streaming media content 1010, then, during playback of that media segment, fetch a next media segment for playback after the first media segment, and so on until the end of the media content.

Figure 2:
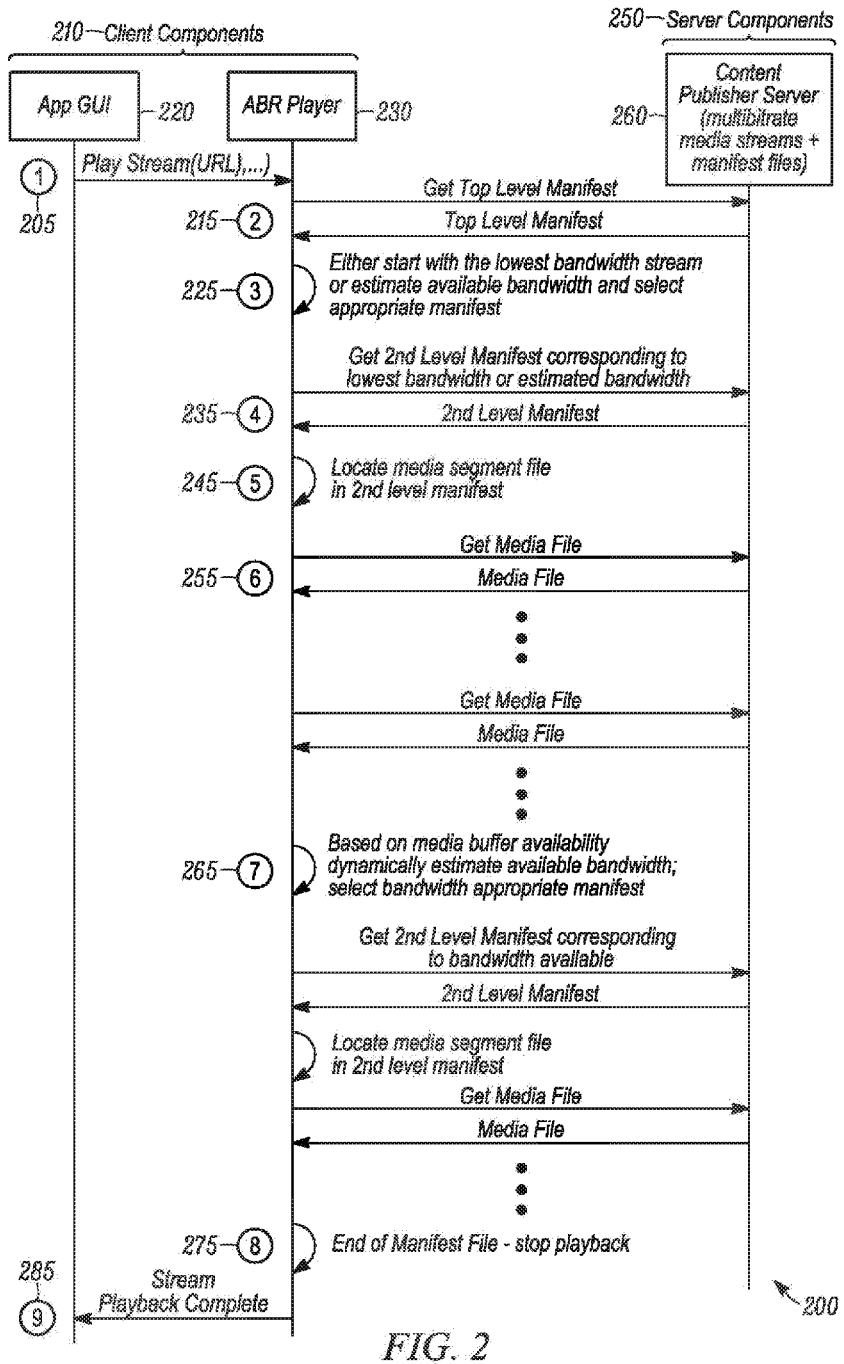
FIG. 2 illustrates a system that includes client components and server components in communication with each other and the message flows for typical adaptive streaming in accordance with embodiments of the disclosure.

Referring to FIG. 2, a system 200 is shown that includes client components 210 and server components 250 in communication with each other and the message flows for typical adaptive streaming. Flows related to security between the client components 210 and server components 250 have been omitted for clarity.

Client components 210 may include an application graphic user interface ("App GUI") 220 and ABR player 230. Server components 250 may include a content-publishing server 260 which may be configured to store or produce multi-bitrate media steams and manifest files.

In a first step 205, a user navigates through movie listings and selects an audiovisual media asset for viewing. In some embodiments, the audiovisual media asset is linked to a URL pointing to a high-level playlist.

In a next step 215, the ABR player 230 requests a top- or high-level manifest file for the audiovisual media asset that includes information about the ABR profiles and links to the manifests corresponding to each media bandwidth.

In a next step 225, the ABR player 230 looks at the high-level manifest and either starts by requesting the lowest bandwidth manifest file or optionally may do some bandwidth availability estimation and select the corresponding bandwidth manifest file.

In a next step 235, ABR player 230 requests a 2nd level manifest for the corresponding bandwidth. In a next step 245, ABR player 230 determines the media-segment file in the 2nd level manifest.

In a next step 255, ABR player 230 requests media-segment files in succession. In a next step 265, ABR player 230 continuously monitors the media buffer fullness to determine if it is necessary to request lower or higher bandwidth media-segment representations. For example, if the bandwidth conditions change, the player 230 may be configured to select the corresponding bandwidth manifest file and select media segments in succession.

In a next step 275, when the end of the manifest file is reached, the ABR player 230 signals the App GUI 220 that playback of the audiovisual media asset is complete. This signaling that the stream playback is complete is shown as step 285.

Figure 3A:
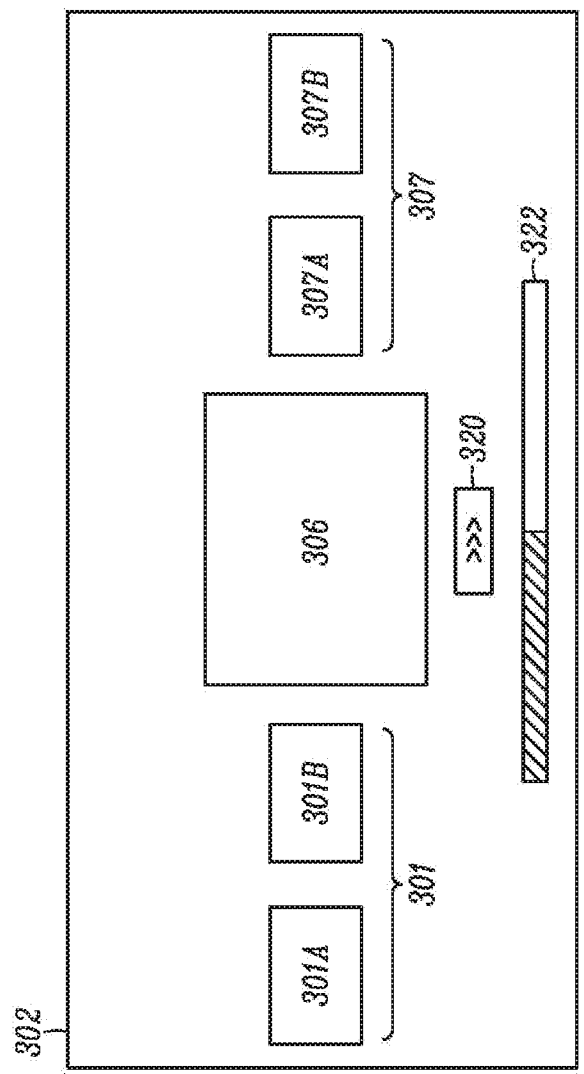
FIG. 3A illustrates a display of multiple still images from an audiovisual media file.

FIG. 3A illustrates an example display of multiple still images from an audiovisual medium. As shown, there are two still images in a first image position, one still image in a second image position, and two still images in a third image position, as displayed in a video display for use in a trick play of streaming media. Each of the still images is, for example, a JPG still graphical image and is not displayed directly from the video stream for the program. It should be appreciated that FIG. 3 is provided to describe an overview of using a slider or progress bar and shows an example of how still image data and trick-play operations (e.g., Pause, Fast Forward, Rewind) may be presented to a user.

In an embodiment, a screen display 302 on a video monitor or similar device comprises a first image position 301 comprising one or more still images 301A, 301B, a second image position 306 comprising one still image, and a third image position 307 comprising one or more other still images 307A, 307B. Image positions 301, 306, and 307 display still images that were generated from the audiovisual media. The still images are displayed in sequential order as they appear in the audiovisual media with the first or earliest images in position 301 and last or later images in position 307. The screen display 302 also may comprise a movement icon 320 and a progress bar 322.

In an embodiment, a streaming media processor (e.g., processor 120 which is typically part of playback device 1002) displays screen display 302 in response to user input from an input device (e.g., playback device 1002) requesting a navigation or seek function. For example, assume that a user is viewing a movie using the playback device 1002 and a streaming video protocol and then presses a "fast forward" button on playback device 1002 or selects and drags the slider of a media-player application. In response to this action, the streaming media processor 120 changes the display to show screen display 302. The streaming media processor 120 no longer displays the streaming media but displays a set of still images 301, 306, 307 that have been sampled from the movie or program in the form represented in screen display 302. In an embodiment, a full-screen, full-motion display of the audiovisual media is changed to screen display 302 which shows five of the still images in successive positions 301, 306, 307. Further, the images in display 302 move successively from right to left as fast forward control proceeds. In one embodiment the streaming video is frozen, and the still image or images 301, 306, 307 are overlaid on top of the frozen video, which may be darkened or dimmed to emphasize the overlaid stills.

In one embodiment, media processor 120 displays screen display 302 in response to the user selecting and dragging the slider of a media-player application. In response to this action, the media-player application replaces or overlays the display, which generates and sends a forward or rewind command to processor 120 depending on the direction the slider is moved. In response to the forward or rewind command, the media-player application replaces or overlays the display of the streaming media with a set of still images representing the content of the program at a time point close to that represented by the position of the slider. Further, images in display 302 may move successively from right to left or left to right as the user continues to drag the slider forward or backward. When the user releases the slider, or pauses dragging the slider for a period of time, the media processor 120 may begin to re-buffer the content at a time point close to that represented by the position of the slider. When a sufficient portion of the media at the new time point is buffered, the media processor 120 replaces the displayed still images with playback of the buffered content. The thumbnail image displayed based on the last position of the slider may have a time offset corresponding to the start of a media-segment file that can be retrieved by the ABR player from the content server to begin playback at the desired location.

While FIG. 3A illustrates a screen display comprising three images positions 301, 306, and 307, the screen display may comprise more than three image positions or less than three image positions. For example, screen display 302 may comprise a single image position comprising one of the still images. Continuing the example, as a forward or rewind command is received by media processor 120, the displayed still image is replaced with a sequentially adjacent still image from still images (e.g., the next nearest still image to the time point of the replaced still image in the time direction of the navigation or seek operation).

Figure 3B:
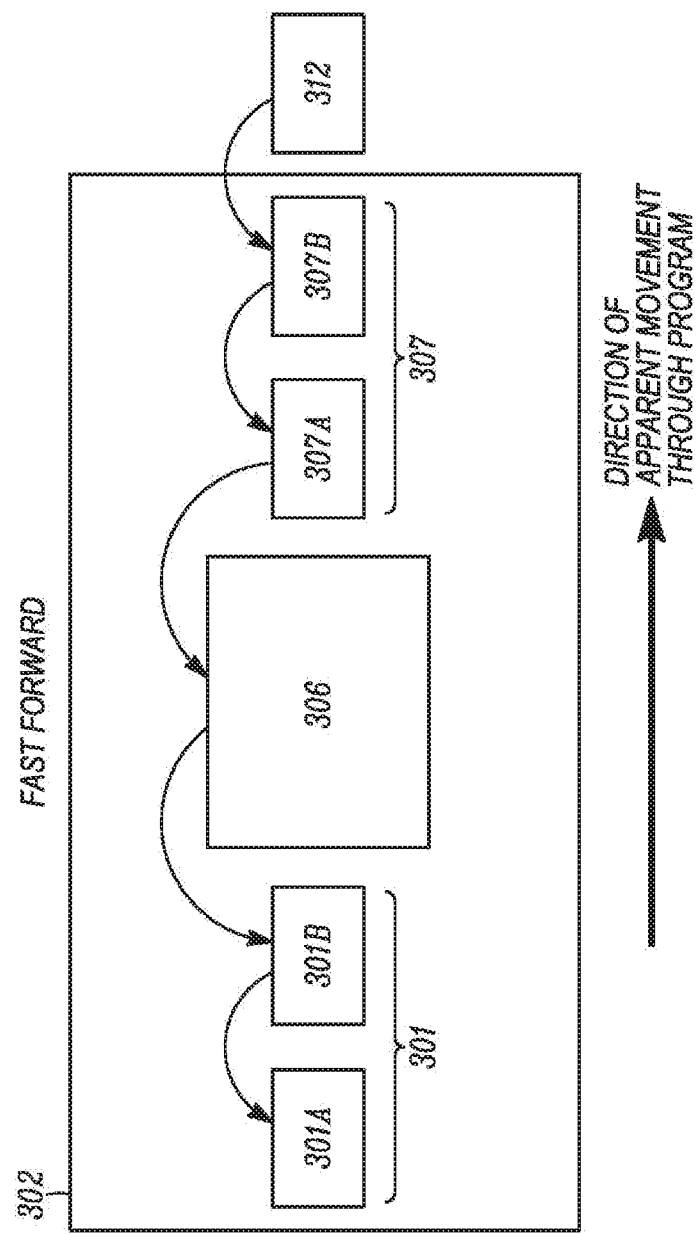
FIG. 3B illustrates movement of the still images of FIG. 3A in a fast forward operation.

Referring now to FIG. 3B, during a fast forward operation, image 301A disappears and appears to have moved off the screen to the left. Image 301B replaces image 301A, and concurrently the image in position 306 moves leftward to position 301 to replace image 301B. Image 307A moves leftward into the second position 306. Image 307B moves leftward to replace image 307A. A new image 312 from among the previously downloaded still images replaces the image 307B. As a result, the user appears to be moving through the program at fast-forward speed in the direction indicated by the arrow at the bottom of FIG. 3B. The process, however, does not involve displaying the audiovisual media using a streaming media protocol but rather involves successively displaying the separately received still images in successively different positions on the screen and concurrently moving the images to their new positions to provide an illusion of rapidly moving through the streaming data of the audiovisual media.

In an embodiment, repeated selection of a fast-forward button or rewind button on playback device 1002 causes the system to toggle through successive still images, and thus the user can rapidly advance at periodic intervals through the program. Alternatively, the same function may be implemented in response to a user pressing and holding a fast-forward or rewind button.

In another embodiment, dragging the slider of a media-player application causes the system to toggle through successive still images. The rate at which the user drags the slider across the screen can be used by the system to determine the rate of display of successive still images.

Movement icon 320 indicates a speed of fast-forward or rewind operation among multiple available speeds. In an embodiment, repeated selection of a fast-forward button or rewind button on playback device 1002 causes the system to toggle through successively higher movement speeds for the current trick-play mode (fast forward or rewind) until the highest movement speed is reached. Selecting the same button again then causes a return to the lowest available movement speed for that trick-play mode. As a movement speed changes, the movement icon 320 changes to illustrate the then-current speed.

Images move among different positions in screen display 302 at a greater or lesser speed depending on the selected movement of the progress bar. In an embodiment, a speed change may be accomplished by selectively skipping certain of the still images and not displaying them so that the program appears to be advancing more rapidly. Alternatively, a speed change may be accomplished by causing certain of the still frames in the first image position or the third image position never to be displayed in the second image position, but to jump directly to the opposite side of the screen into either the first image position or third image position as appropriate. For example, in the arrangement of FIG. 3A, to implement a faster speed still image 307A might move directly to the position of still image 301B or still image 301A and might never appear in the second position 306. Alternatively, a speed change may be accomplished by changing the amount of time during which each of the still images is displayed on the screen—that is, the presentation time of the images. A combination of two or more of these techniques also may be used.

The rate of display of the still images may be used to give the appearance of faster or slower progression through the program material. For example, if still images have been collected at 10-second program intervals, then displaying one still per second gives the appearance of progressing through the program material at 10 times ("10×") the normal viewing speed, displaying every second still image at two-thirds of a second per still gives the appearance of 30× speed, displaying every fourth still image at half second intervals gives the appearance of 80× speed, and so on. Thus, the rate of display of the still images may be used to hint at higher speeds of traversing the program material but does not stress the media processor in the way that displaying all the frames of the program material at the equivalent rate of display would stress the processor.

Progress bar 322 may illustrate a relative amount of the audiovisual medium that has been played and may also include one or more markers, such as vertical bars, to indicate relative positions within program of the still images that are shown in display 302. One or more of the still images of display 302 may be indicated in the progress bar 322. For example, the progress bar 322 may comprise a marker only for the still image in the second image position 306.

In some embodiments, the progress bar is included within a slider component of a media-player application. In such embodiments, the slider may be used to invoke trick-play operations by selecting and dragging the slider forward or backward using a cursor-control device such as a mouse.

In an embodiment, chapter points within audiovisual media are represented using markers on progress bar 322. In an embodiment, as the user drags the slider of a media-player application the progress bar "snaps" to the nearest chapter point in the direction the slider is being moved. The chapter points may be represented by still images, such as 301, 306, and 307. These chapter point images are usually provided in predetermined intervals, such as 10-second program intervals, as described above. The progress bar "releases" from the chapter point only after the user has moved the slider sufficiently far away from the marker representing the chapter point. A distinct audio signal may accompany the action of snapping progress bar 322 to a chapter point.

Figure 3C:
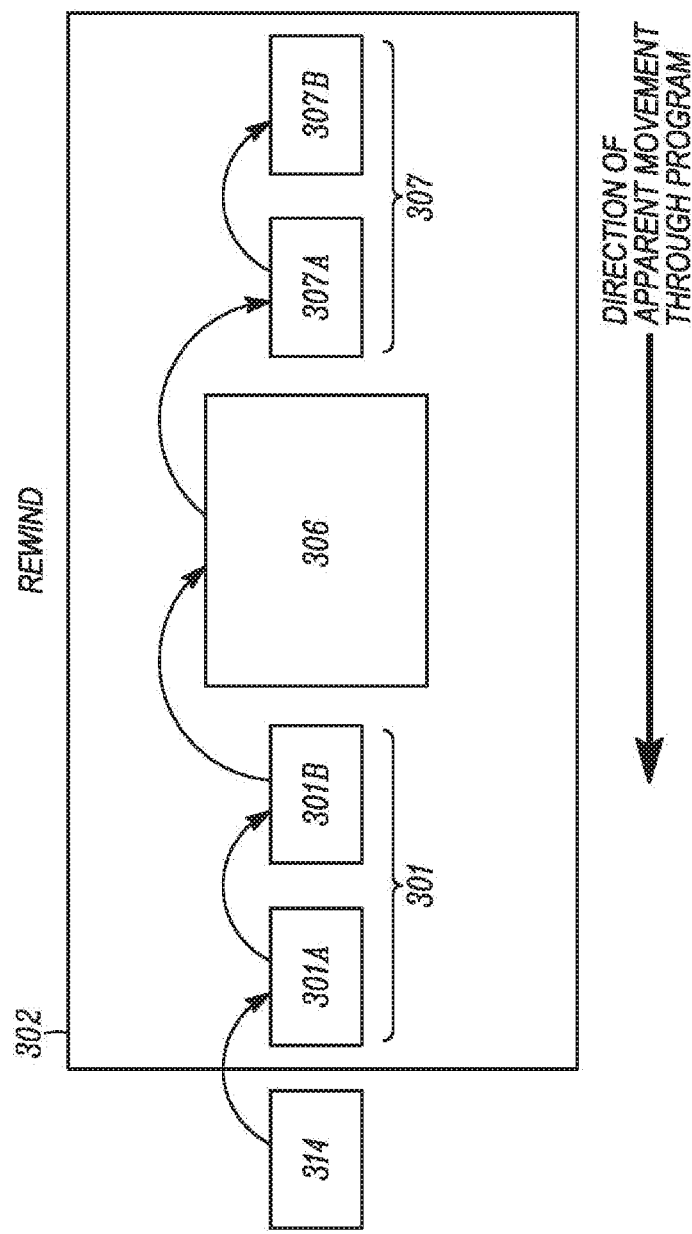
FIG. 3C illustrates movement of the still images of FIG. 3A in a rewind operation.

FIG. 3C illustrates movement of the still images of FIG. 3A in a rewind operation. When a rewind trick-play mode is selected, the still images in screen display 302 move as indicated above for FIG. 3B but in an opposite direction. For example, a new still image 314 replaces still image 301A in position 301, and image 301A moves rightward to replace image 301B. Concurrently, image 301B moves into the second position 306. The image at second position 306 moves rightward to replace image 307A, which moves to replace image 307B. The previously displayed image 307B appears to disappear off the screen to the right. As a result, the display appears to be rewinding the audiovisual media to move through the program in the direction indicated by the arrow at the bottom of FIG. 3C.

In an embodiment, each still image that is displayed in the second image position 306 is displayed in a size larger than the sizes of images in first and second image positions 301, 307. This approach gives the second image position 306 more prominence and gives the user a focal point while still providing the user with image references in the first and second positions 301, 307 to indicate what came before and what comes next.

As described above, the user may move through an audiovisual medium by skipping over chapter points using a trick-play operation. However, one of the primary goals of any video delivery system is generating revenue from advertising. This is an ongoing challenge between content providers who want to ensure ad delivery and viewers who want to avoid ad delivery (e.g., by using trick play).

A technique that may be used in live streaming and video on-demand applications is trick-play disablement. For example, when a playlist or top-level manifest file transitions to program event content (e.g., ad content), a flag may be transmitted to a set-top box ("STB") to disable trick-play operations such as fast forward or jump. This may prevent the end user from avoiding the presentation of the ad. However, this approach relies on instructions in the STB to enforce the trick mode disablement. Because the STB is a closed device controlled by a system provider, content providers may be assured that trick-play disablement will be enforced. There is no such assurance for programs running on mobile devices in general, such as tablets or smartphones. In fact, programs running on these devices may be purposely designed to enable end users to avoid ads.

Figure 4:
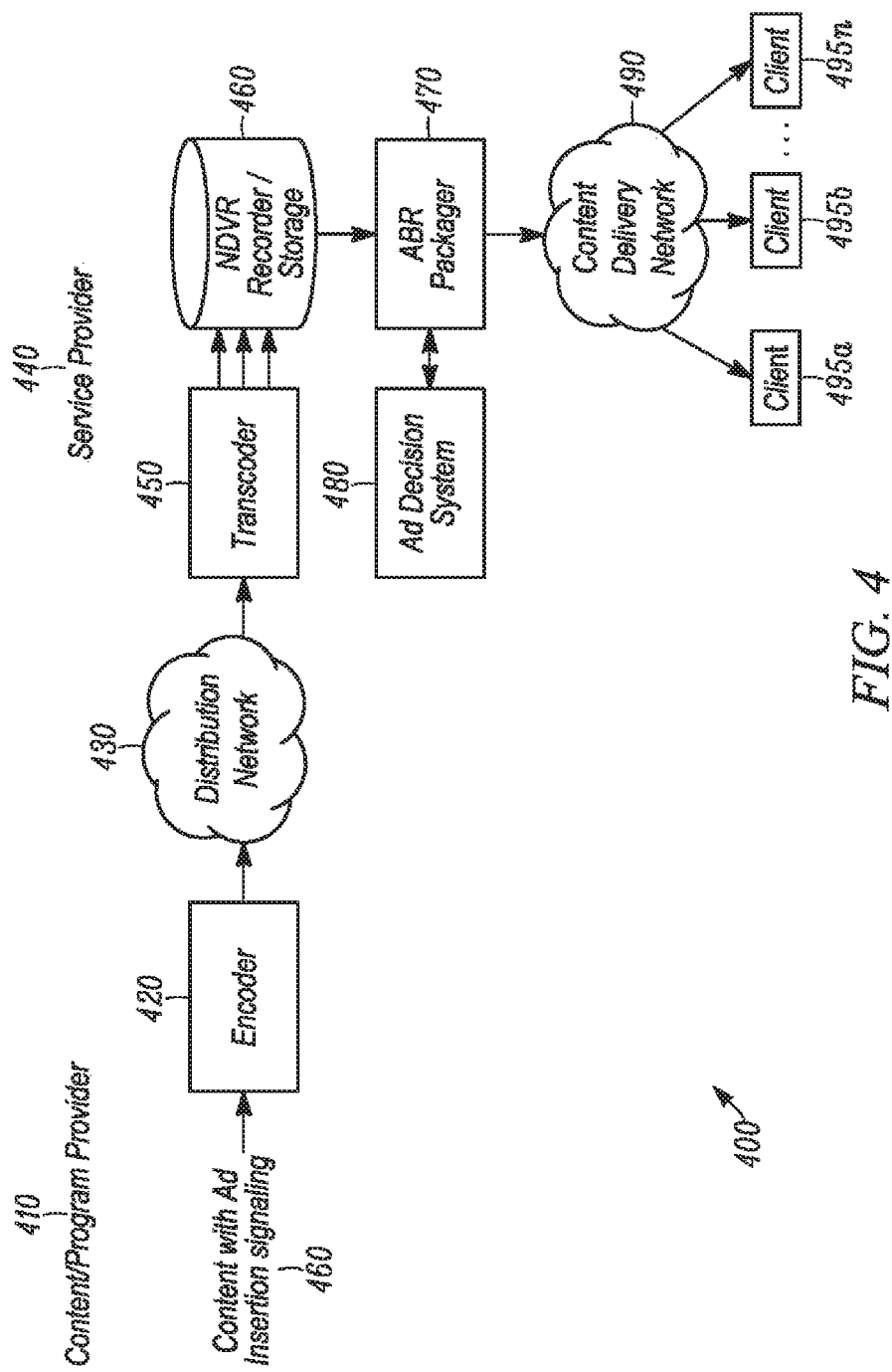
FIG. 4 illustrates an example system that includes an encoder for distributing compressed video content from a Content/Program Provider over a network to a Service Provider in accordance with embodiments of the disclosure.

Referring to FIG. 4, an example system 400 includes an Encoder 420 configured to distribute compressed video content from a Content/Program Provider 410 over any number of possible distribution networks 430 (e.g., satellite, fiber, the Internet, etc.) to a Service Provider 440 with the goal of delivering this content to subscriber client devices as an ABR streaming service. In FIG. 4, the content may be re-encoded by a Transcoder 450 into a format acceptable for ABR streaming and recorded in a Network Digital Video Recorder ("NDVR") appliance 460 for on-demand delivery. An ABR Packager 470 is responsible for communicating with each client and preparing ("packaging") individual ABR streams in real-time, as requested by each client. The ABR Packager 470 may retrieve client-specified stream segments from the NDVR 460 and translate them into the appropriate ABR format on a per-client or session basis. The ABR Packager 470 may also communicate with an Ad Decision System ("ADS") 480 to determine which, if any, local advertisements or alternate content to substitute during an ad break (e.g., ad opportunity). Associated trick-play restrictions may also be conveyed via this interface.

ABR Packager 470 communicates with and delivers content to each client 495 via Content Delivery Network 490. In some embodiments, each client 495 is an ABR player. For example, a particular client 495 may be instructed to obtain specific content (e.g., an On-Demand movie or recorded broadcast program) from the ABR Packager 470. The ABR Packager 470 then communicates with the NDVR appliance 460 to obtain the top-level and second-level manifests for that content. These manifests may include details concerning the placement of advertisements—or ad opportunities (e.g., "avails")—within that content. The ABR Packager 470 may then communicate with the ADS 480 to determine the playback restrictions, if any, that must be applied for that specific content and client. If no ADS 480 is present or available, the ABR Packager 470 may be configured to permit or prevent trick-play operations that allow the client 495 to skip the advertisements included in the content. The ABR Packager 470 subsequently retrieves file segments from the NDVR appliance 460 as requested by the client 495 and delivers them to the client 495, with restriction on the timing of their delivery dependent upon configuration of the ABR Packager 470 and rules established by the ADS 480 for that content and client 495 and for that specific time or session.

The encoded content may include program events, notably advertisement events or placement opportunities for ad insertion, signaled by the Content/Program Provider 410 using a protocol such as SCTE-35 (e.g., as metadata). These metadata are passed by Transcoder 450 to the NDVR 460. When this content is subsequently retrieved from—or streamed by—NDVR 460 to ABR Packager 470, the specific timeframe for each ad insertion event or placement opportunity may be included in messaging to the ABR Packager 470. This information may once again be conveyed in-band using SCTE-35 signaling, or the NDVR 460 may generate a special manifest file denoting the specific content segments containing advertisements or opportunities. This manifest could be a standard HLS m3u8 playlist or DASH manifest, for example, including special tags not intended for end-user client device consumption.

Using this ad information, ABR Packager 470 knows which particular ABR segments it delivers correspond to advertisement events and can take action to prevent or allow client fast-forwarding or skipping of said segments. This trick-play enforcement policy may be static or dynamic (e.g., as governed by the ADS 480), depending on any number of conditions, e.g., the time a program was originally aired, the number of times a particular client has viewed the program, the validity of the advertisement (e.g., an ad aired during winter may not be applicable for summer), client preference (e.g., a premium subscriber versus a basic subscriber), and so on.

Figure 5:
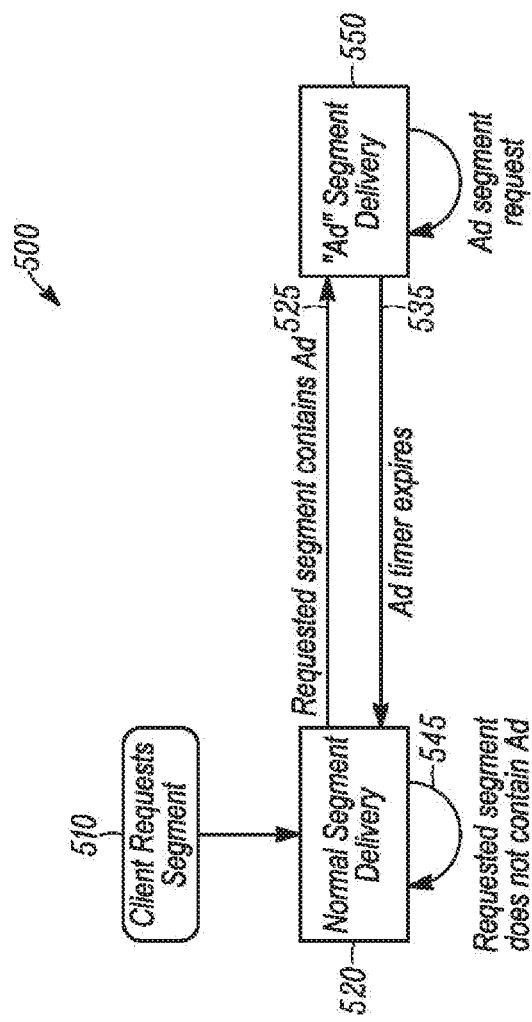
FIG. 5 illustrates an example of trick-play enforcement by an ABR Packager in accordance with embodiments of the disclosure.

An example of a trick-play enforcement process 500 by the ABR Packager 470 is illustrated in FIG. 5. As shown, a client 495 initiates a session at block 510 with the ABR Packager 470 to retrieve specific program segments. As long as the client 495 requests non-ad segments that do not span an ad or placement opportunity, as indicated by arrow 545, the system remains in the Normal Segment Delivery state 520. Otherwise, once an ad segment is requested, as indicated by arrow 525, the system transitions to an Ad Segment Delivery state 550, and a trick-play restriction timer is set corresponding to the signaled duration of the ad (or consecutive ads). In this state 550, client requests for content segments after the current ad break are denied by the ABR Packager 470. In another embodiment, the ABR Packager 470 may instead reply with the next un-retrieved ad segment, thereby forcing the client device to download, decode, and play the ad. Once the timer expires, as indicated by arrow 535, the system reverts to the Normal Segment Delivery state 520 in which unfettered trick-play operation is supported.

FIG. 6 illustrates an example of trick-play enforcement at sequential instances of time. As shown, a recorded program 610 includes a finite number of contiguous segments 615 that span a time period t. Within program 610 are regular segments 612 (non-ad containing) and ad segments 618.

Figure 6A:
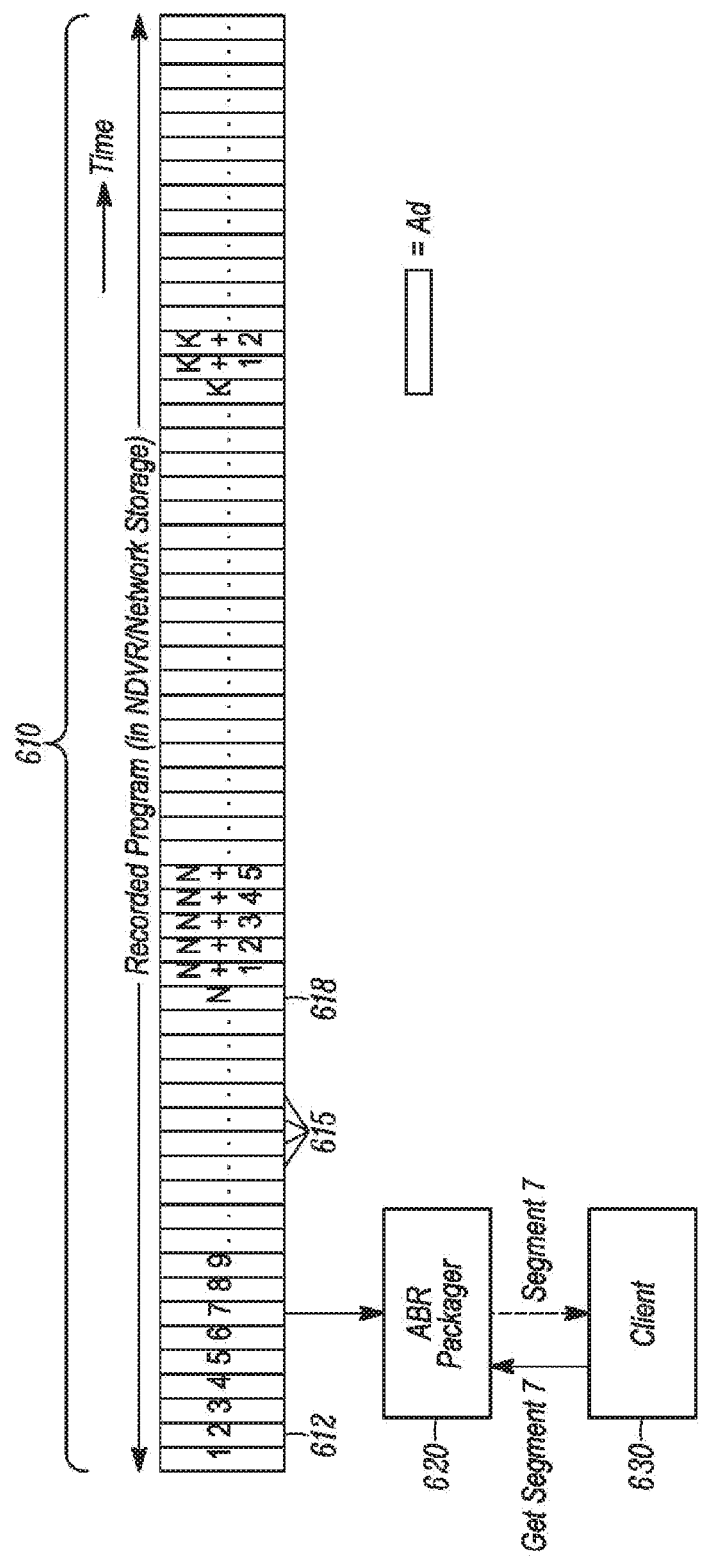

In FIG. 6A, a client 630 requests a regular segment (segment 7) from ABR Packager 620. ABR Packager 620 retrieves segment 7 from recorded program 610 and provides it to client 630.

Figure 6B:
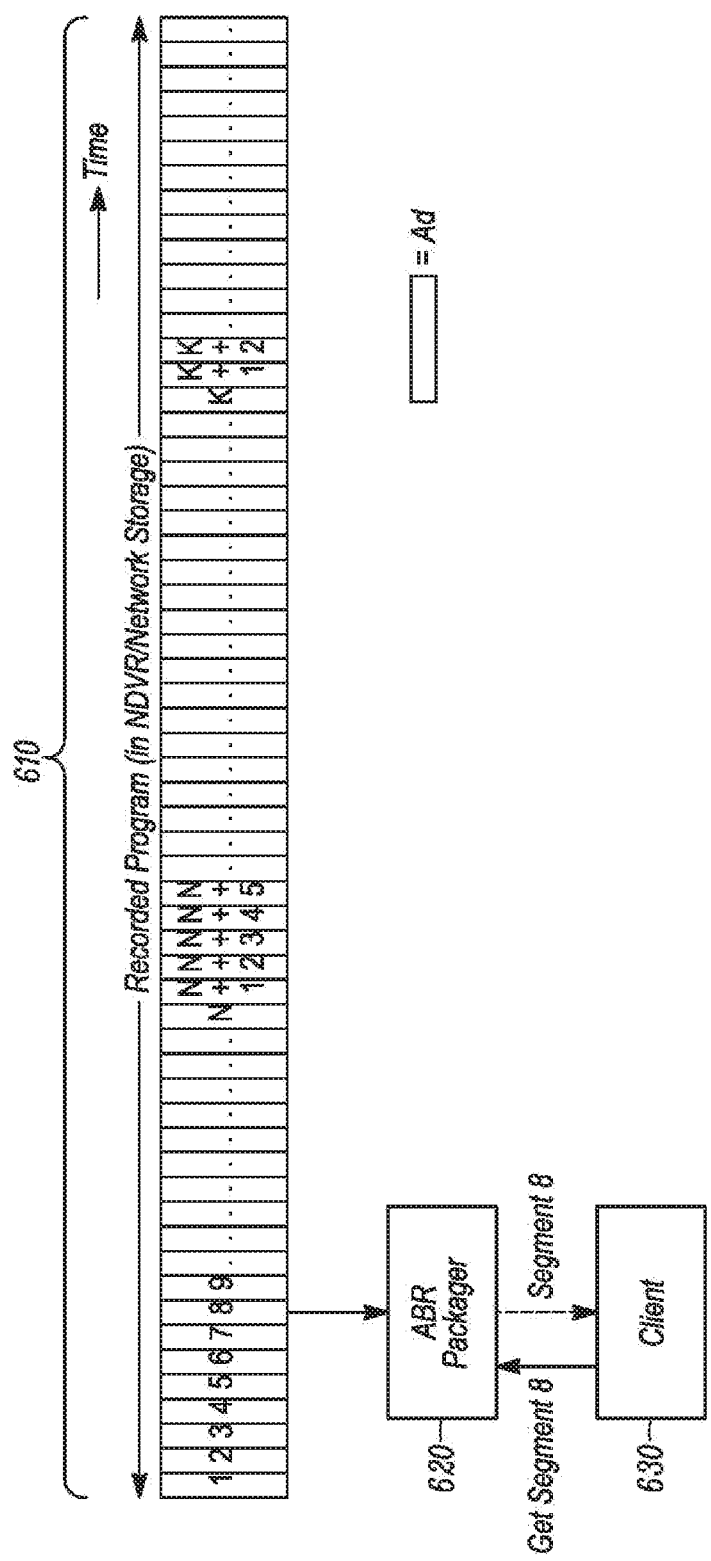

In FIG. 6B, client 630 similarly requests a regular segment (segment 8) from ABR Packager 620. ABR Packager 620 retrieves segment 8 from recorded program 610 and provides it to client 630.

FIGS. 6C1 and 6C2 are alternate embodiments of how a trick-play enforcement system may operate when a client requests a segment that will skip ad segments. In FIG. 6C1, client 630 requests a next segment that is past an ad segment (segment N+6) as indicated by arrow 645. In response, ABR Packager 620 rejects the client's request until an Ad Timer expires, as indicated by 635. In FIG. 6C2, when the client 630 requests a next segment that is past an ad segment (segment N+6), the ABR Packager 620 forces the delivery of the next sequential segment (segment 9) as indicated by arrow 655, instead of the requested segment.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

What is claimed is:

1. A method comprising:
   receiving program event information indicating whether a media asset is to be presented with supplemental content;
   receiving, from a client, a request for a media-segment file corresponding to the media asset for consumption at the client;
   in response to receiving the request, identifying the media-segment file corresponding to the media asset;
   determining, by a processing device executing an adaptive bitrate ("ABR") packager, whether the program event information indicates that the media asset is to be presented with the supplemental content; and
   providing the media-segment file corresponding to the media asset to the client, wherein the media-segment file comprises a restriction on trick-play operations, wherein the restriction is applied to the trick-play operations in response to the program event information indicating that the media asset is to be presented with the supplemental content and restriction criteria are met.

2. The method of claim 1, further comprising generating a top level manifest file for the media asset.

3. The method of claim 2, further comprising providing the top level manifest file to a real time adaptive bitrate ("ABR") packager.

4. The method of claim 1 wherein restricting trick-play operations comprises imposing a predetermined time period for the supplemental content to be decoded before a user retrieves subsequent media-segment files.

5. The method of claim 4, wherein the predetermined time period is determined from a time protocol splice or program event signaling.

6. The method of claim 4, wherein the predetermined time period is unique per client.

7. The method of claim 4, wherein the ABR packager is to dynamically adjust the predetermined time period on a per-program, per-supplemental content, or per-client basis.

8. The method of claim 1, wherein the supplemental content is identifiable by in-band signaling.

9. The method of claim 8, wherein the in-band signaling uses a time protocol.

10. The method of claim 1 wherein restricting trick-play operations comprises preventing delivery of future media-segment files until the supplemental content has been retrieved.

11. The method of claim 1 wherein the supplemental content comprises one or more of: sponsored content, sponsored content opportunities, or content provider-supplied indications of supplemental content importance.

12. The method of claim 1, further comprising determining the media-segment file from corresponding element manifest files.

13. The method of claim 1, wherein the supplemental content is identifiable by a flag in a top level manifest file ingested by the ABR packager.

14. A system comprising:
   a memory; and
   a processing device operatively coupled to the memory, to execute an adaptive bitrate packager to:
   receive program event information indicating whether a media asset is to be presented with supplemental content;
   receive, from a client, a request for a media-segment file corresponding to the media asset for consumption at the client;
   in response to receiving the request, identify the media-segment file corresponding to the media asset;
   determine whether the program event information indicates that the media asset is to be presented with the supplemental content; and
   providing the media-segment file corresponding to the media asset to the client, wherein the media-segment file comprises a restriction on trick-play operations in response to the program event information indicating that the media asset is to be presented with the supplemental content and restriction criteria are met.

15. The system of claim 14, further comprising:
   a video coder server operatively coupled to the memory, the video coder server to receive a program stream comprising the program event information indicating whether the program stream is to be presented with the supplemental content and to output multiple adaptive bitrate ("ABR") streams.

16. The system of claim 15, further comprising:
   an ABR packager configured to request at least one of the multiple ABR streams from the memory and to deliver the at least one of the multiple ABR streams to the client.

17. The system of claim 16, wherein the ABR packager is further configured to interpret the program event information.

18. The system of claim 15, wherein the video coder server comprises a video decoder to decode the program stream.

19. The system of claim 14, further comprising a decision system in communication with the processing device, the decision system to determine which local sponsored content or alternate content to substitute during a sponsored content break.

20. A non-transitory machine-readable storage medium storing instructions which, when executed, cause a processing device to execute an adaptive bitrate ("ABR") packager to perform operations comprising:
   receiving program event information indicating whether a media asset is to be presented with supplemental content;
   receiving, from a client, a request for a media-segment file corresponding to the media asset for consumption at the client;
   in response to receiving the request, identifying the media-segment file corresponding to the media asset;
   determining, by the ABR packager, whether the program event information indicates that the media asset is to be presented with the supplemental content; and
   providing the media-segment file corresponding to the media asset to the client, wherein the media-segment file comprises a restriction on trick-play operations in response to the program event information indicating that the media asset is to be presented with the supplemental content and restriction criteria are met.

* * * * *